US012621709B2

(12) United States Patent
Yang et al.

(10) Patent No.: US 12,621,709 B2
(45) Date of Patent: May 5, 2026

(54) SYSTEMS AND METHODS FOR EXPLICIT CONGESTION NOTIFICATION IN A RADIO ACCESS NETWORK

(71) Applicant: Verizon Patent and Licensing Inc., Basking Ridge, NJ (US)

(72) Inventors: Jin Yang, Orinda, CA (US); Wei David Huang, Danville, CA (US); Gerardo S. Libunao, Manalapan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 308 days.

(21) Appl. No.: 18/462,104

(22) Filed: Sep. 6, 2023

(65) Prior Publication Data

US 2025/0081033 A1      Mar. 6, 2025

(51) Int. Cl.
*H04W 28/02*        (2009.01)
*H04L 47/31*        (2022.01)

(52) U.S. Cl.
CPC ......... *H04W 28/0289* (2013.01); *H04L 47/31* (2013.01)

(58) Field of Classification Search
CPC ........................... H04W 28/0289; H04L 47/31
See application file for complete search history.

(56) References Cited

U.S. PATENT DOCUMENTS

2025/0133023 A1*  4/2025  Östberg ............ H04W 28/0289
2025/0150402 A1*  5/2025  Östberg ................. H04L 47/33

OTHER PUBLICATIONS

"5G; Management and orchestration; 5G performance measurements (3GPP TS 28.552 version 16.6.0 Release 16)", Technical Specification: ETSI TS 128 552 V16.6.0, 196 pages. (Aug. 2020).
"LTE; Evolved Universal Terrestrial Radio Access (E-UTRA) and Evolved Universal Terrestrial Radio Access Network (E-UTRAN); Overall description; Stage 2 (3GPP TS 36.300 version 14.2.0 Release 14)", Technical Specification: ETSI TS 136 300 V14.2.0, 346 pages. (Apr. 2017).

* cited by examiner

*Primary Examiner* — Minh Chau Nguyen

(57) ABSTRACT

A device may include a processor configured to monitor a data flow, associated with a user equipment (UE) device, in a Radio Access Network (RAN). The processor may be further configured to detect a congestion condition for the monitored data flow associated with the UE device; generate an Explicit Congestion Notification (ECN) in response to detecting the congestion condition; and mark packets associated with the data flow with the generated ECN.

20 Claims, 8 Drawing Sheets

130

475

| DATA FLOW ID 510 | UE DEVICE ID 520 | BASE STATION ID 530 | ROUTING INFO 540 | CONGESTION INFO 550 | ECN 560 |
|---|---|---|---|---|---|

500

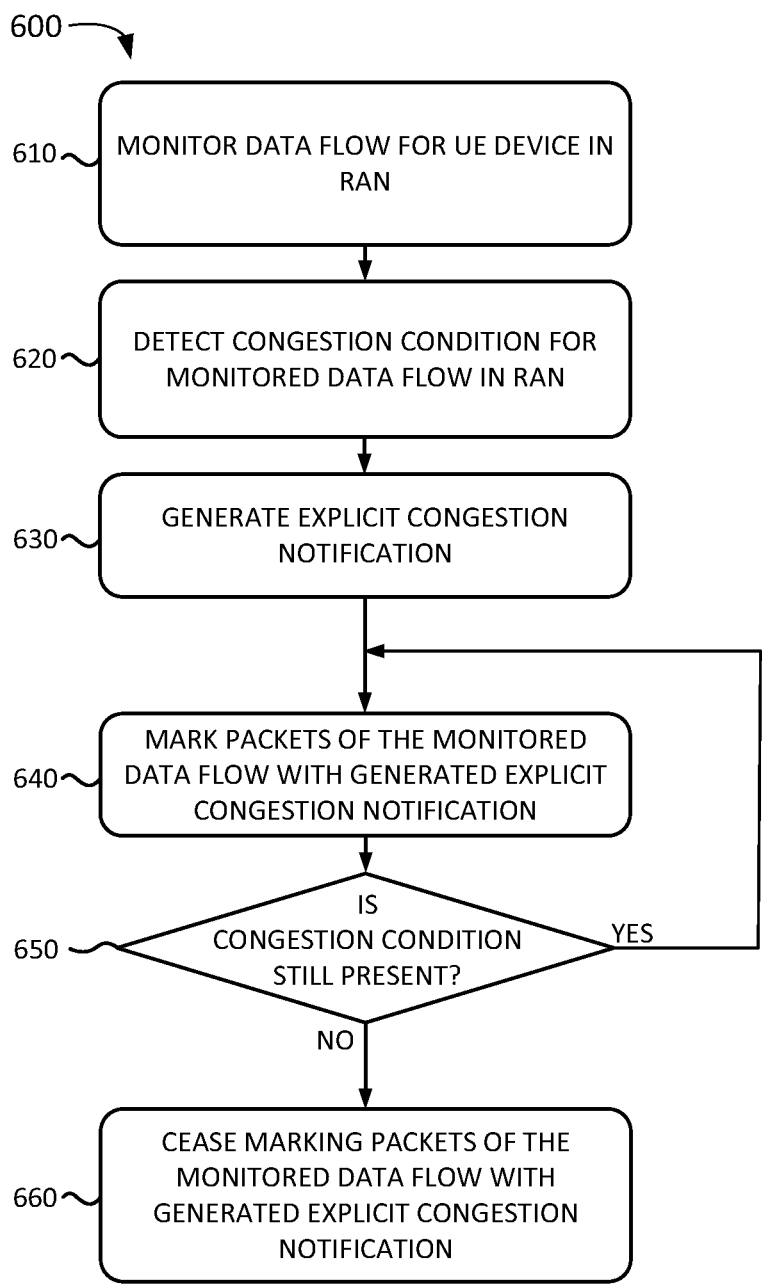

600

610 — MONITOR DATA FLOW FOR UE DEVICE IN RAN

620 — DETECT CONGESTION CONDITION FOR MONITORED DATA FLOW IN RAN

630 — GENERATE EXPLICIT CONGESTION NOTIFICATION

640 — MARK PACKETS OF THE MONITORED DATA FLOW WITH GENERATED EXPLICIT CONGESTION NOTIFICATION

650 — IS CONGESTION CONDITION STILL PRESENT?

YES

NO

660 — CEASE MARKING PACKETS OF THE MONITORED DATA FLOW WITH GENERATED EXPLICIT CONGESTION NOTIFICATION

FIG. 6

SYSTEMS AND METHODS FOR EXPLICIT CONGESTION NOTIFICATION IN A RADIO ACCESS NETWORK

BACKGROUND INFORMATION

To satisfy the needs and demands of users of mobile communication devices, providers of wireless communication services continue to improve and expand their networks. One aspect of such improvements includes the development of wireless access networks and options to utilize such wireless access networks. A provider may operate a wireless access network that manages a large number of user devices using different types of services under varying conditions. Managing different types of services under varying conditions poses various challenges.

BRIEF DESCRIPTION OF THE DRAWINGS

FIG. 6 illustrates a flowchart for performing Explicit Congestion Notification (ECN) marking in a RAN according to an implementation described herein.

DETAILED DESCRIPTION OF EMBODIMENTS

Figure 1:
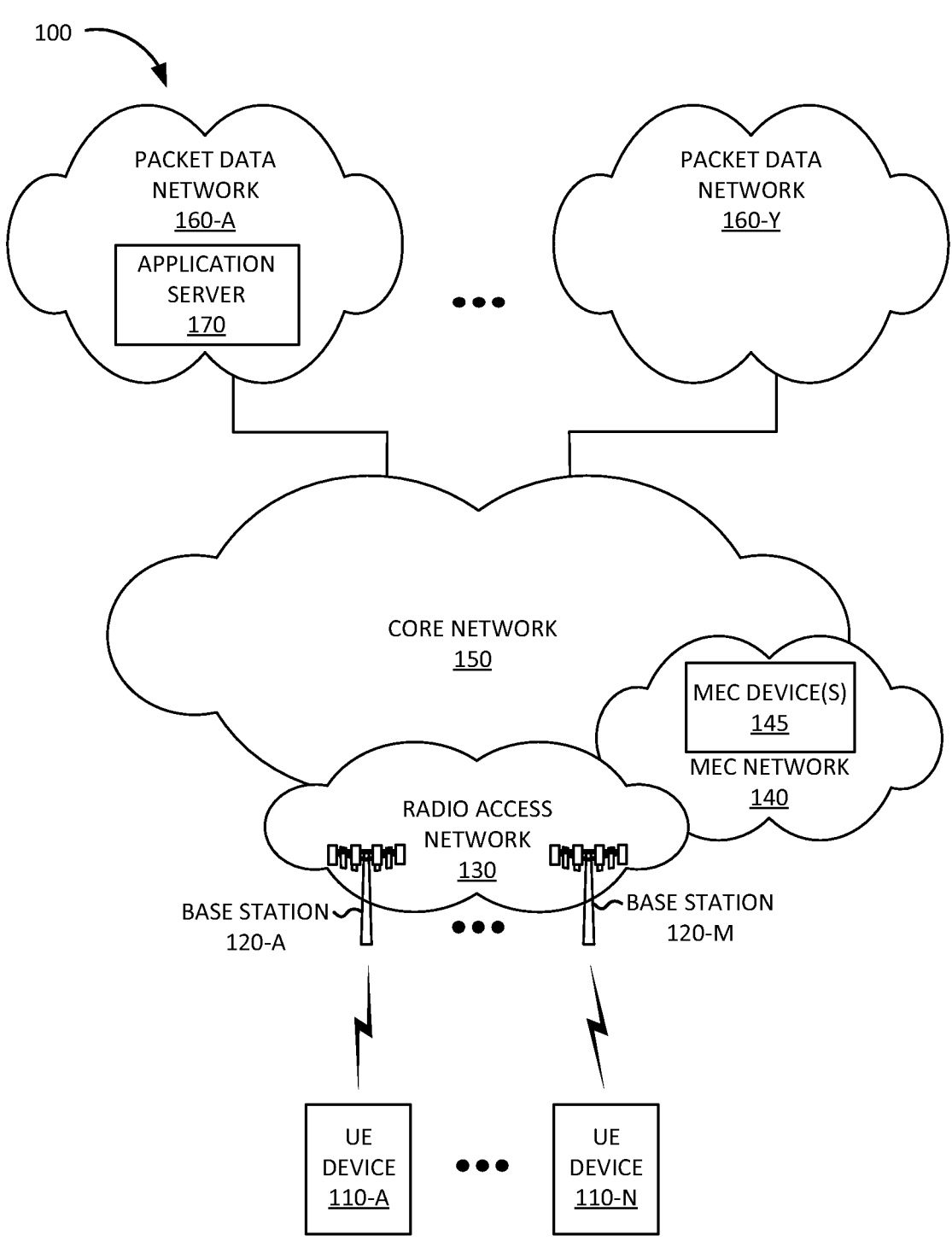
FIG. 1 illustrates an environment according to an implementation described herein.

The following detailed description refers to the accompanying drawings. The same reference numbers in different drawings identify the same or similar elements.

A cellular wireless network enables user equipment (UE) devices to connect to networks via a Radio Access Network (RAN) and a core network in order to communicate with other devices connected to the RAN, communicate with devices in other networks, access applications or services hosted by a provider in the core network, and/or make use of other types of communication services. For example, a UE device may use enhanced Mobile Broadband (eMBB) services for Voice over Internet Protocol (VoIP) telephone calls and/or data sessions for accessing Internet websites, use massive Internet of Things (IoT) communication as an IoT device, use Ultra-Reliable Low Latency Communication (URLLC) for mission critical low latency communication, etc. Each type of communication service may be associated with a different set of requirements.

In order to establish a communication session, a UE device may establish a Protocol Data Unit (PDU) session in the core network via the RAN. The UE device may then establish one or more data flows in the PDU session. Each data flow may be associated with a Quality of Service (QoS) and/or other types of service requirements. Conditions associated with a data flow in a wireless network may vary. For example, a UE device may move from an area with good signal coverage to an area with poor signal coverage, resulting in a decrease in signal strength and/or signal quality. As another example, a base station may experience an increase in traffic load, resulting in an increase in signal latency. Changes in the conditions associated with a data flow in a wireless network may result in a congestion condition. A congestion condition may prevent the service requirements associated with the data flow to be satisfied.

A UE device may provide a congestion notification using an Over-The-Top (OTT) notification. For example, an application running on the UE device may detect a decrease in throughput or an increase in a packet drop rate and/or packet error rate, and, in response, send a notification to an application server associated with the application that the application is experiencing a congestion condition. However, an OTT notification may be too slow to enable the application server to adjust to a congestion condition in an efficient manner. For example, the conditions of a wireless connection may be subject to high variability and an OTT notification may be received by the application server after the conditions have already changed, resulting in slow adaptation of the data rate for the data flow by the application server. Thus, OTT congestion notifications may be too slow for applications that may benefit from a rapid rate adaptation, such as live video applications, extended reality (XR) applications, etc.

A more efficient congestion notification mechanism includes the use of an Explicit Congestion Notification (ECN). Traditionally, Transmission Control Protocol (TCP) and/or Internet Protocol (IP) networks signal congestion by dropping packets. ECN enables congestion notification without dropping packets. An ECN, implemented as part of a Low Latency, Low Loss, and Scalable Throughput (L4S) Internet service, corresponds to setting a field, in a packet header, which indicates a congestion condition is present. Therefore, if the ECN field (or ECN bits in a particular field of a header) in a packet header is marked, a recipient may detect the presence of congestion.

Implementations described herein relate to systems and methods for ECN in a RAN. One or more devices in a RAN may be configured to mark packets associated with a data flow with an ECN based on one or more parameter values for the data flow, one or more parameter values for a UE device associated with the data flow, and/or parameter values for a base station associated with the data flow. For example, a Centralized Unit (CU) in the RAN may monitor a data flow associated with a UE device, detect a congestion condition for the monitored data flow, generate an ECN in response to detecting the congestion condition, and mark packets associated with the data flow with the generated ECN. For example, the CU may mark packet headers of Packet Data Convergence Protocol (PDCP) packets with the generated ECN. The ECN may enable an application server to quickly and efficiently respond to the congestion condition by, for example, adjusting a data rate (e.g., reduce the data rate, etc.) for the data flow.

The CU may detect the congestion condition for the monitored data flow based on receiving a congestion notification for the monitored data flow from a Distributed Unit (DU) in the RAN via, for example, an F1 interface. The DU may be configured to monitor one or more parameters associated with the data flow and send a congestion notification in response to determining that a threshold for a particular parameter has been reached or exceeded. The congestion notification sent from the DU to the CU may include an indication that a signal strength or quality parameter value for wireless signals, for the monitored data flow associated with the UE device, is below a signal strength or quality threshold. For example, the signal strength or quality parameter value may include a Channel Quality Indicator (CQI) value. Furthermore, the congestion notification sent from the DU to the CU may include an indication that a loading parameter value for a base station associated with the UE device is above a loading threshold. For example, the loading parameter value may include a Physical Resource Block (PRB) utilization rate value. Additionally, the congestion notification sent from the DU to the CU may include an indication that the threshold for a particular parameter has been below the parameter threshold for at least a threshold length of time.

The DU may continue to monitor the parameters associated with the data flow and may send another congestion notification to the CU indicating the congestion condition has ceased to exist, in response to determining that a particular parameter has been below the parameter threshold for at least a threshold length of time. The CU may receive the congestion notification indicating that the congestion condition no longer exists and may, in response, cease to mark packets associated with the data flow with the generated ECN.

Additionally, or alternatively, the CU may detect the congestion condition for the monitored data flow based on monitoring status information associated with the data flow. For example, the CU may determine that a Buffer Status Report (BSR) associated with the monitored data flow indicates that a buffer level has exceeded a buffer threshold and mark packets associated with the monitored data flow with the ECN in response.

In some implementations, the CU may be configured to mark packets travelling in an opposite direction to packets travelling a direction for which the congestion condition is detected. For example, if the CU determines a congestion condition exists for downlink packets travelling to a UE device associated with the data flow, the CU may mark uplink packets, associated with the data flow and travelling from the UE device to an application server, with the ECN. Thus, the application server may respond to the ECN more quickly and adjust a data rate for the data flow.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in a RAN 130, a MEC network 140 (which includes MEC devices 145), a core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a Wi-Fi® access point, a fixed wireless access device, a smart television, etc.; a portable gaming system; a home appliance device; a home monitoring device; and/or any other type of computer device with wireless communication capabilities. In some implementations, UE device 110 may communicate using machine-to-machine (M2M) communication, such as Machine Type Communication (MTC), and/or another type of M2M communication for IoT applications.

RAN 130 may include base stations 120. Base station 120 may be configured for one or more Radio Access Technology (RAT) types. For example, base station 120 may include a Fifth Generation (5G) New Radio (NR) base station (e.g., a gNodeB) and/or a Fourth Generation (4G) Long Term Evolution (LTE) base station (e.g., an eNodeB). Each base station 120 may include devices and/or components that enable cellular wireless communication with UE devices 110. For example, base station 120 may include a radio frequency (RF) transceiver configured to communicate with UE devices 110 using a 5G NR air interface, a 4G LTE air interface, and/or using another type of cellular air interface. Base station 120 may enable UE device 110 to communicate with core network 150.

MEC network 140 may be associated with one or more base stations 120 and may provide MEC services for UE devices 110 attached to the base stations 120. MEC network 140 may be in proximity to base stations 120 from a geographic and network topology perspective, thus enabling low latency services to be provided to UE devices 110. As an example, MEC network 140 may be located on the same site as base station 120. As another example, MEC network 140 may be geographically closer to one of base stations 120 and reachable via fewer network hops and/or fewer switches, than other base stations 120.

MEC network 140 may include one or more MEC devices 145. MEC devices 145 may provide MEC services to UE devices 110. A MEC service may include, for example, a low-latency microservice associated with a particular application, a microservice associated with a virtualized network function (VNF) of core network 150, a cloud computing service, such as cache storage service, artificial intelligence (AI) accelerator service, machine learning service, an image processing service, a data compression service, a locally centralized gaming service, a Graphics Processing Units (GPUs) and/or other types of hardware accelerator service, and/or other types of cloud computing services. Some or all of the functionality of application server 170 may be performed by MEC device 145.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 160. In some implementations, core network 150 may include a 5G core network. In other implementations, core network 150 may include a 4G core network (e.g., an evolved packet core (EPC) network) and/or another type of core network.

The components of core network 150 may be implemented as dedicated hardware components or as virtualized functions implemented on top of a common shared physical infrastructure using Software Defined Networking (SDN). For example, an SDN controller may implement one or more of the components of core network 150 using an adapter implementing a virtual network function (VNF) virtual machine, a Cloud Native Function (CNF) container, an event driven serverless architecture interface, and/or another type of SDN component. The common shared physical infrastructure may be implemented using one or more devices 300 described below with reference to FIG. 3 in a cloud computing center associated with core network 150. Additionally, or alternatively, some, or all, of the shared physical infrastructure may be implemented using one or more devices 300 implemented in MEC device 145 in MEC network 140.

PDNs 160-A to 160-Y may each be associated with a Data Network Name (DNN) in 5G, and/or an Access Point Name (APN) in 4G. UE device 110 may request a connection to PDN 160 using a DNN or an APN. PDN 160 may include, and/or be connected to, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

PDN 160 may include an application server 170 (shown in PDN 160-A in FIG. 1 for illustrative purposes). Application server 170 may provide services for an application running on UE device 110 and may establish an application session with UE device 10 via RAN 130 and core network 150. RAN 130 and core network 150 may establish a communication session or data flow between UE device 110 and application server 170. Application server 170 may detect an ECN in a data flow associated with UE device 110 and may, in response, perform rate adaptation on the data flow. For example, application server 170 may reduce a data rate at which packets are sent to UE device 110 and/or may instruct an application running on UE device 110 to reduce a data rate at which packets are sent by UE device 110 to application server 170.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
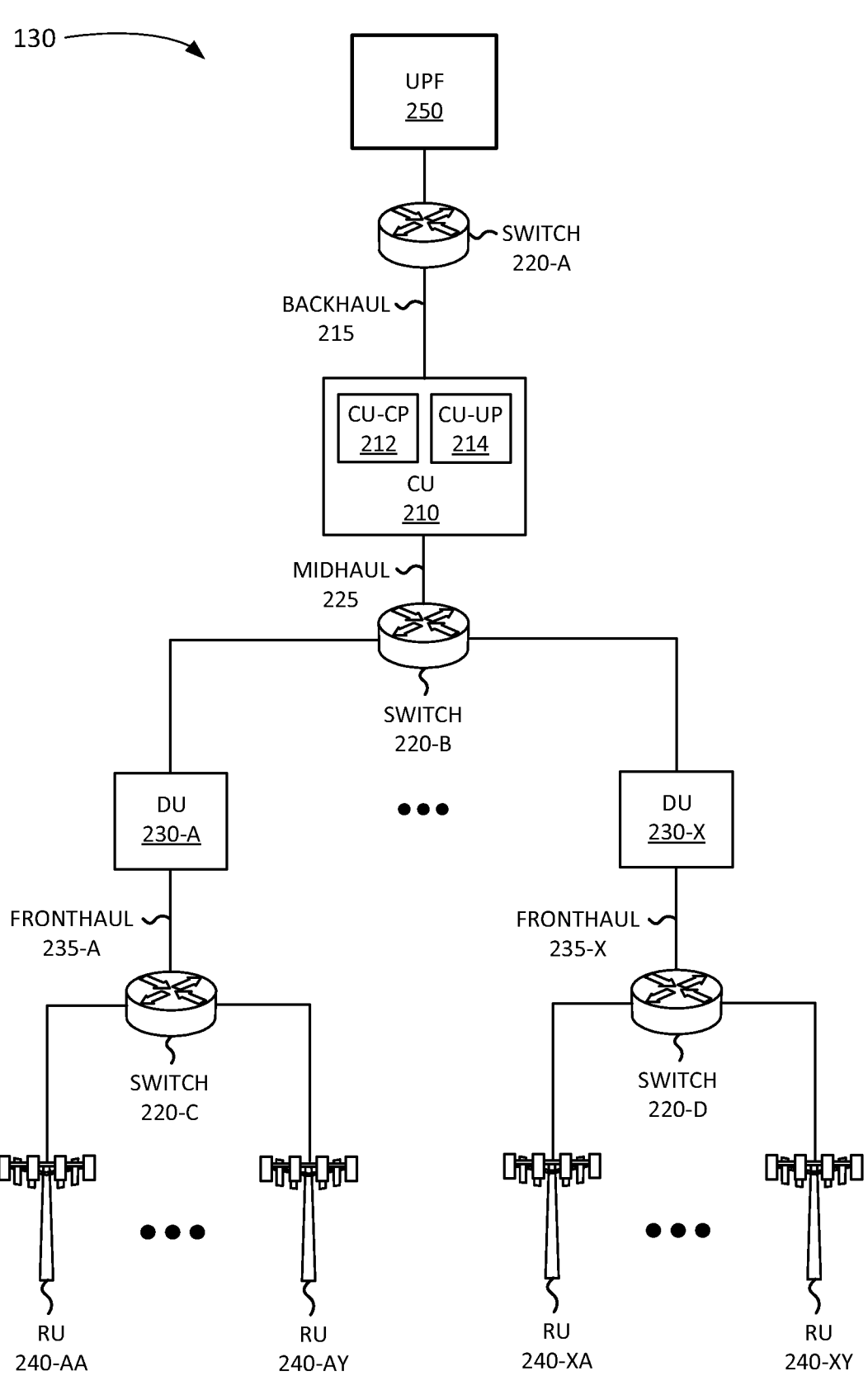
FIG. 2 illustrates exemplary components of a Radio Access Network (RAN) according to an implementation described herein.

FIG. 2 illustrates exemplary components of RAN 130 according to an implementation described herein. As shown in FIG. 2, RAN 130 may include a CU 210, switches 220A, 220-B, 220-C, and 220-D (referred to herein collectively as "switches 220" and individually as "switch 220"), DU 230-A to 230-X (referred to herein collectively as "DUs 230" and individually as "DU 230"), and RUs 240-AA to 240-XY (referred to herein collectively as "RUs 240" and individually as "RU 240"). The components of RAN 130 may satisfy the requirements set forth by the 3$^{rd}$ Generation Partnership Project (3GPP). Furthermore, in some implementations, the components of RAN 130 may additionally satisfy the standardized architecture requirements of the Open RAN (O-RAN) Alliance to enable the components of RAN 130 from different suppliers to be compatible and operate together.

CU 210 may include a logical node that includes the functionality for control flow processing for base station 120, including, for example, the functionality to generate and/or process Radio Resource Control (RRC) protocol messages, Service Data Adaptation Protocol (SDAP) messages, and/or Packet Data Convergence Protocol (PDCP) messages. CU 210 may include CU-CP 212 and CU-UP 214. CU-CP 212 may perform control plane processing for CU 210 and may control one or more DUs 230. CU-UP 214 may perform data plane processing for CU 210, such as forwarding and/or routing messages between DU 230 and core network 150 via a User Plane Function (UPF) 250. Furthermore, in some implementations, CU-CP 212 and/or CU-UP 214 may perform ECN marking on a data flow in response to detecting a congestion condition associated with the data flow. UPF 250 may function as a gateway to PDN 160. CU-CP 212 may set up PDU sessions in DU 230 and CU-UP 214. CU 210 may terminate an F1 interface with DU 230 and an N3 interface with UPF 250. Furthermore, while FIG. 2 shows UPF 250 connected to CU 210 via backhaul 215, in other implementations UPF 250 may be co-located with CU-UP 214. In yet other implementations, backhaul 215 may include a connection to MEC network 140, before or after UPF 250.

Switches 220 may perform switching and/or routing in RAN 130. For example, switch 220-A may perform routing along backhaul 215 from CU 210 to UPF 230, switch 220-B may perform switching and/or routing along midhaul 225 between DUs 230-A to 230-X and CU 210, switch 220-C may perform switching along fronthaul 235-A between RUs 240-AA to 240-AY and DU 230-A, and switch 220-D may perform switching along fronthaul 235-X between RUs 240-XA to 240-XY and DU 230-X. While a single switch 220 is shown for backhaul 215, midhaul 225, fronthaul 235-A, and fronthaul 235-X for illustrative purposes, in practice each of backhaul 215, midhaul 225, fronthaul 235-A, and fronthaul 235-X may include multiple switches 220. Switches 220, fronthaul 235, midhaul 225, backhaul 215, and CU-UP 214 may be considered part of the transport network that enables RAN 130 to connect to core network 150.

DU 230 may include a logical node that includes lower level functionality for processing (e.g., Layer 2 and/or Layer 1 processing) for gNodeB 210, including, for example, functionality to generate and/or process Radio Link Control (RLC) messages, Media Access Control (MAC) messages, and/or physical (PHY) layer messages. DU 230 may support multiple RUs 240. RU 240 may include an RF transceiver with one or more antenna arrays. In some implementations, RU 240 and DU 230 may be collocated and/or implemented in the same device. Furthermore, DU 230 may monitor data flows associated with UE device 110 and may send a congestion notification to CU 210 over the F1 interface in response to detecting a congestion condition for a data flow.

Although FIG. 2 shows exemplary components of RAN 130, in other implementations, RAN 130 may include fewer components, different components, differently arranged components, or additional components than depicted in FIG. 2.

Figure 3:
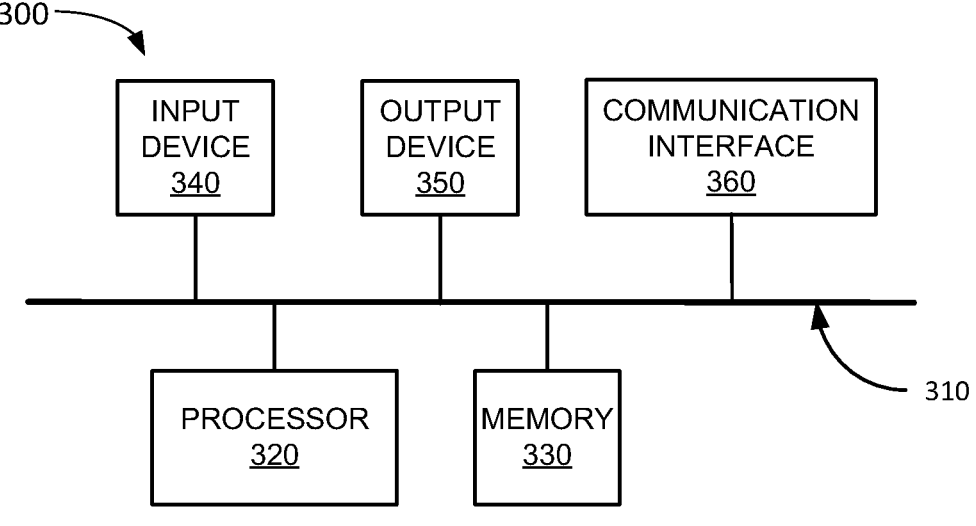
FIG. 3 illustrates exemplary components of device that may be included in a component of an environment according to an implementation described herein.

FIG. 3 illustrates example components of a device 300 according to an implementation described herein. UE device 110, base station 120, MEC device 145, application server 170, CU-CP 212, CU-UP 214, switch 220, DU 230, RU 240, UPF 250, and/or other components of core network 150 or RAN 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. Additionally, or alternatively, processor 320 may include a hardware accelerator integrated circuit or processing logic, such as a graphics processing unit (GPU), a tensor processing unit (TPU), and/or another type of hardware accelerator.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to ECN marking in a RAN. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
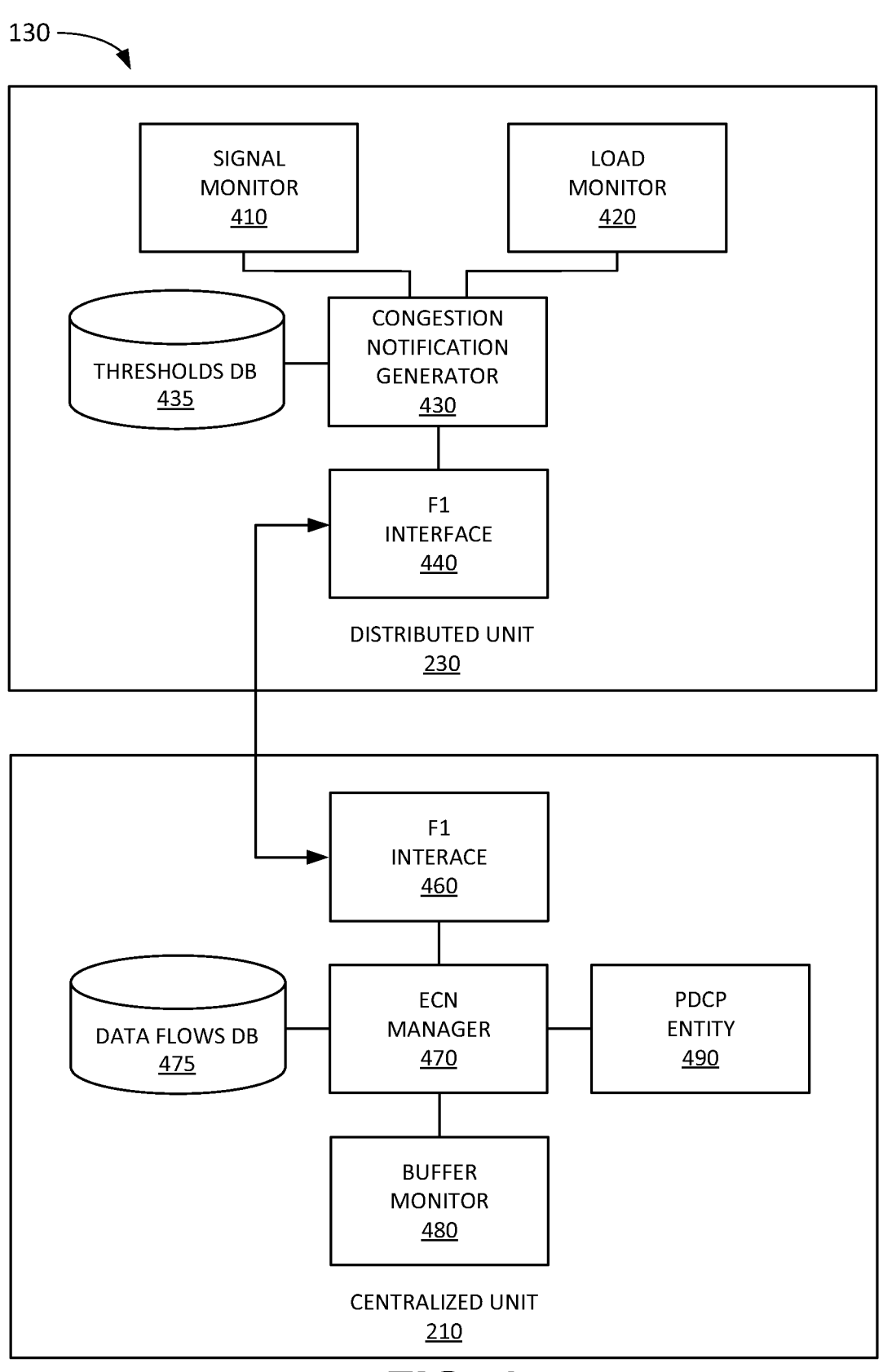
FIG. 4 illustrates exemplary components of a Distributed Unit and a Centralized Unit according to an implementation described herein.

FIG. 4 is a diagram illustrating exemplary components of CU 210 and DU 230 in RAN 130. The components of CU 210 and/or DU 230 may be implemented, for example, via processor 320 executing instructions from memory 330. Alternatively, some or all of the components of CU 210 and/or DU 230 may be implemented via hard-wired circuitry. As shown in FIG. 4, DU 230 may include a signal monitor 410, a load monitor 420, a congestion notification generator 430, a thresholds database (DB) 435, and an F1 interface 440.

Signal monitor 410 may monitor one or more signal strength and/or quality parameters associated with a data flow. For example, signal monitor 410 may monitor values for CQI and/or other parameters values, such as values for Reference Signal Received Power (RSRP), Reference Signal Received Quality (RSRQ), Received Signal Strength Indicator (RSSI), Signal to Interference and Noise Ratio (SINR), Block Error Rate (BLER), and/or other values for other parameters indicative of signal strength and/or quality. Signal monitor 410 may obtain the signal strength and/or quality parameter values from measurement reports sent by UE device 110 to base station 120.

Load monitor 420 may monitor one or more load parameters associated with a data flow. For example, load monitor 420 may monitor values for a PRB utilization rate for base station 120 serving UE device 110 associated with the data flow and/or other parameter values associated with base station 120, such as values for downlink average throughput, downlink maximum throughput, uplink average throughput, uplink maximum throughput, average processor load, average number of users, maximum number of users, a number of voice bearers, a number of video bearers, and/or another parameter indicative of loading associated with base station 120.

Congestion notification generator 430 may generate a congestion notification based on information receive from signal monitor 410 and/or load monitor 420 and based on information stored in thresholds DB 435. Thresholds DB 435 may store one or more thresholds used to determine whether a data flow satisfies a congestion condition. For example, thresholds DB 435 may store one or more signal strength and/or quality thresholds and/or a threshold length of time that a particular signal strength and/or quality threshold is to be satisfied before a congestion condition is identified and a congestion notification is sent. As another example, thresholds DB 435 may store one or more loading thresholds and/or a threshold length of time that a particular loading threshold is to be satisfied before a congestion condition is identified and a congestion notification is sent. If information received from signal monitor 410 and/or load monitor 420 indicates that a congestion condition is satisfied, congestion notification generator 430 may send a congestion notification to CU 210 via F1 interface 440. F1 interface 440 may implement an F1 interface to enable communication with CU 210.

CU 210 may include an F1 interface 460, an ECN manager 470, a data flows DB 475, a buffer monitor 480, and a PDCP entity 490. F1 interface 460 may implement an F1 interface to enable communication with DU 230. ECN manager 470 may manage ECN marking of data flows. For example, ECN manager 470 may detect a congestion condition for a data flow and, in response, mark the data flow with an ECN by instructing PDCP entity to insert an ECN into the headers of IP packets associated with the data flow. ECN manager 470 may store information relating to the data flows in data flows DB 475. Data flows DB 475 may store information relating to data flows managed by CU 210. Exemplary information that may be stored in data flows DB 475 is described below with reference to FIG. 5.

ECN manager 470 may detect a congestion condition for a data flow based on receiving a congestion notification from DU 230. Additionally, or alternatively, ECN manager 470 may detect a congestion condition for a data flow based on detecting that a congestion threshold has been satisfied for one or more parameters monitored by CU 210. For example, ECN manager 470 may receive an indication from buffer monitor 480 that a buffer level for a data flow has exceeded a buffer threshold and may determine that a congestion condition exists for the data flow in response. Buffer monitor 480 may monitor a buffer associated with a data flow by monitoring BSRs for the buffer. If a BSR indicates that a buffer level has exceeded a buffer threshold, buffer monitor 480 may send an indication to ECN manager 470 that the buffer threshold has been reached. In other implementations, DU 230 may also include a buffer monitor 480 and DU 230 may send an indication that a buffer level has exceeded a buffer threshold in a congestion notification to CU 210. In some implementations, BSRs may be monitored for uplink data flow congestion and downlink buffers associated with a data flow may be monitored by CU 210 and/or DU 230 for downlink data flow congestion.

If ECN manager 470 determines that a data flow is associated with a congestion condition, ECN manager 470 may generate an ECN and instruct PDCP entity 470 to add mark IP headers of packets for the data flow with the ECN. PDCP entity 490 may manage the PDCP layer of the protocol stack for CU 210. For example, for downlink packets, PDCP entity 490 may receive packets from PRBs, store the packets in a transmission buffer, perform header compression, perform ciphering, and add PDCP headers to the packets. For uplink packets, the PDCP entity 490 may remove the PDCP headers, perform deciphering, and perform header decompression. If PDCP entity 490 was instructed by ECN manager 470 to mark packets with the ECN, PDCP entity 490 may add the generated ECN in the IP headers of IP packets associated with the data flow.

ECN manager 470 may mark packets travelling in an opposite direction to packets travelling a direction for which the congestion condition is detected. For example, if the congestion condition exists for downlink packets travelling to UE device 110 associated with the data flow, ECN manager 470 may mark uplink packets, associated with the data flow and travelling from UE device 110 to application server 170, with the ECN, to enable application server 170 to respond more quickly to the congestion condition.

Although FIG. 4 shows exemplary components of CU 210 and/or DU 230, in other implementations, CU 210 and/or DU 230 may include fewer components, different components, additional components, or differently arranged components than depicted in FIG. 4. Additionally, or alternatively, one or more components of CU 210 and/or DU 230 may perform one or more tasks described as being performed by one or more other components of CU 210 and/or DU 230.

Figure 5:
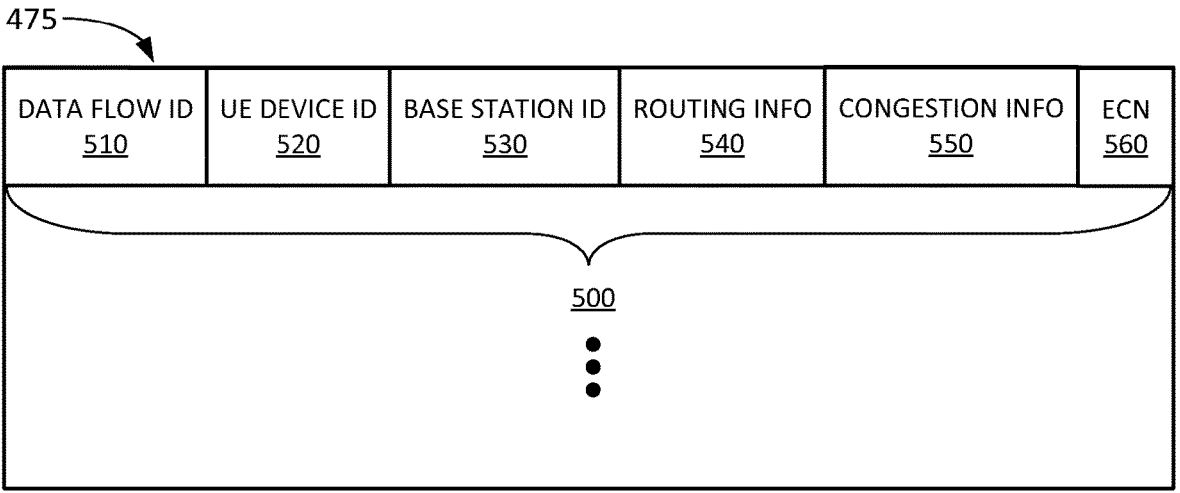
FIG. 5 illustrates exemplary components of a sessions database according to an implementation described herein.

FIG. 5 illustrates exemplary components of data flows DB 475. As shown in FIG. 5, data flows DB 475 may include one or more data flow records 500. Each data flow record 500 may store information associated with a particular data flow. Data flow record 500 may include a data flow identifier (ID) field 510, a UE device ID field 520, a base station ID field 530, a routing information field 540, a congestion information field 550, and an ECN field 560.

Data flow ID field 510 may store an ID for a data flow, such as, for example, a QoS Flow ID (FI) for the data flow. UE device ID field 520 may store an ID for UE device 110 associated with the data flow. For example, UE device ID field 520 may store a Mobile Directory Number (MDN), an International Mobile Subscriber Identity (IMSI), a Mobile Station International Subscriber Directory Number (MSISDN), an International Mobile Equipment Identity (IMEI), an ID associated with the subscription for UE device 110 (e.g., a subscription ID, an account number, etc.), and/or another type of ID for UE device 110. Base station ID field 530 may store an ID for base station 120 servicing UE device 110, such as an ID associated with RU 240 and/or a sector/cell associated with RU 240.

Routing information field 540 may store routing information for the data flow, such as, for example, a Traffic Flow Template (TFT) for the data flow The TFT may include a tuple, such as a 5-tuple that includes a source IP address, a source port, a destination IP address, a destination port, and a protocol, associated with the created data flow. Congestion information field 550 may store congestion information associated with the data flow. For example, congestion information field 550 may store information identifying thresholds that were reached which resulted in a congestion condition being identified. ECN field 560 may store information identifying whether the data flow is currently being marked with an ECN. Furthermore, ECN field 560 may store information identifying time periods during which the data flow was marked with an ECN.

Although FIG. 5 shows exemplary components of data flows DB 475, in other implementations, data flows DB 475 may include fewer components, different components, additional components, or differently arranged components than depicted in FIG. 5.

FIG. 6 illustrates a flowchart for performing ECN marking in a RAN. In some implementations, process 600 of FIG. 6 may be performed by CU 210. In other implementations, some or all of process 600 may be performed by another device or a group of devices.

As shown in FIG. 6, process 600 may include monitoring a data flow for a UE device in a RAN (block 610). For example, UE device 110 may establish a PDU session with core network 150 via RAN 130 and then request a data flow to application server 170 via the PDU session. Core network 150 may create the data flow from UE device 110 to application server 170 via RAN 130 and core network 150. DU 230 and/or CU 210 may monitor the data flow to determine whether a congestion condition occurs in association with the data flow.

Process 600 may further include detecting a congestion condition for the monitored data flow in the RAN (block 620). For example, DU 230 may determine that a signal strength/quality for UE device 110 associated with the data flow has fallen below a signal strength/quality threshold for at least a threshold length of time and may, in response, send a congestion notification to CU 210. As another example, DU 230 may determine that loading for base station 120 associated with the data flow has risen above a loading threshold for at least a threshold length of time and may, in response, send a congestion notification to CU 210. As yet another example, CU 210 and/or DU 230 may determine that the size of a buffer associated with the data flow has reached a size larger than a buffer size threshold.

Process 600 may further include generating an ECN (block 630) and marking packets of the monitored data flow with the generated ECN (block 640). For example, in response to detecting the congestion condition, CU 210 may start marking headers of IP packets associated with the data flow with an ECN by setting an ECN flag in an ECN field of the IP header.

CU 210 may select a congestion status based on the detected congestion condition. CU 210 may maintain one or more thresholds for particular congestion parameters and may select the congestion status based on the thresholds. For example, CU 210 may select a congestion status as light congestion, medium congestion, or heavy congestion. In other implementations, the congestion status may be selected from a different set of congestion status markers. CU 210 may mark packets with an ECN based on the selected congestion status.

For example, for light congestion, CU 210 may mark 10% of the packets of the data flow with the ECN; for medium congestion, CU 210 may mark 25% of the packets of the data flow with the ECN; and for heavy congestion, CU 210 may mark 50% of the packets of the data flow with the ECN. In other implementations, a different percentage of the packets of the data flow may be marked with the ECN. A gradation of ECN marking based on the congestion status may enable application server 170 to make more efficient adaptation decision to generate an appropriate traffic flow based on the congestion condition (e.g., based on the conditions of the radio channel associated with the data flow).

CU 210 may mark packets travelling in an opposite direction to packets travelling a direction for which the congestion condition is detected. For example, if the congestion condition exists for downlink packets travelling to UE device 110 associated with the data flow, CU 210 may mark uplink packets, associated with the data flow and travelling from UE device 110 to application server 170, with the ECN, to enable application server 170 to respond more quickly to the congestion condition.

A determination may be made as to whether the congestion condition is still present (block 650). For example, CU 210 may continue to monitor buffer status reports to determine whether a buffer status continues to satisfy a buffer status threshold. As another example, CU 210 may assume a congestion condition is satisfied until a notification is received from DU 230 that the congestion condition is no longer present. As yet another example, DU 230 may continue to send congestion notifications to CU 210 while the congestion condition is present.

If it is determined that the congestion condition is still present (block 650—YES), processing may return to block 640 to continue to mark packets of the monitored data flow with the generated ECN. If it is determined that the congestion condition is no longer present (block 650—NO), processing may continue to cease marking packets of the monitored data flow with the generated ECN (block 660). For example, in response to detecting that the congestion condition has ended, CU 210 may cease marking headers of IP packets associated with the data flow with an ECN by clearing an ECN flag in an ECN field of the IP header.

Figure 7A:
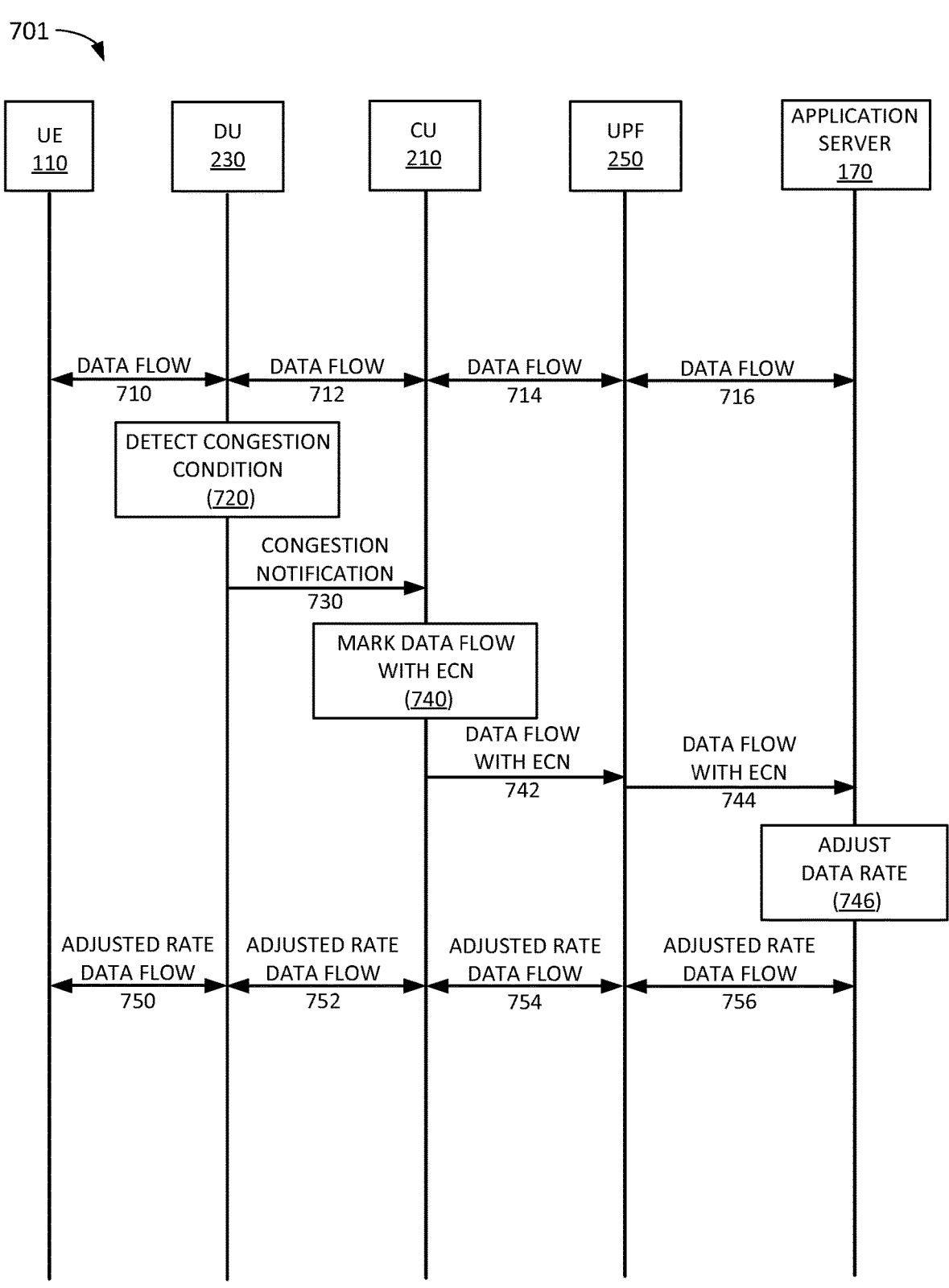
FIGS. 7A and 7B illustrate exemplary signal flows according to an implementation described herein.
Figure 7B:
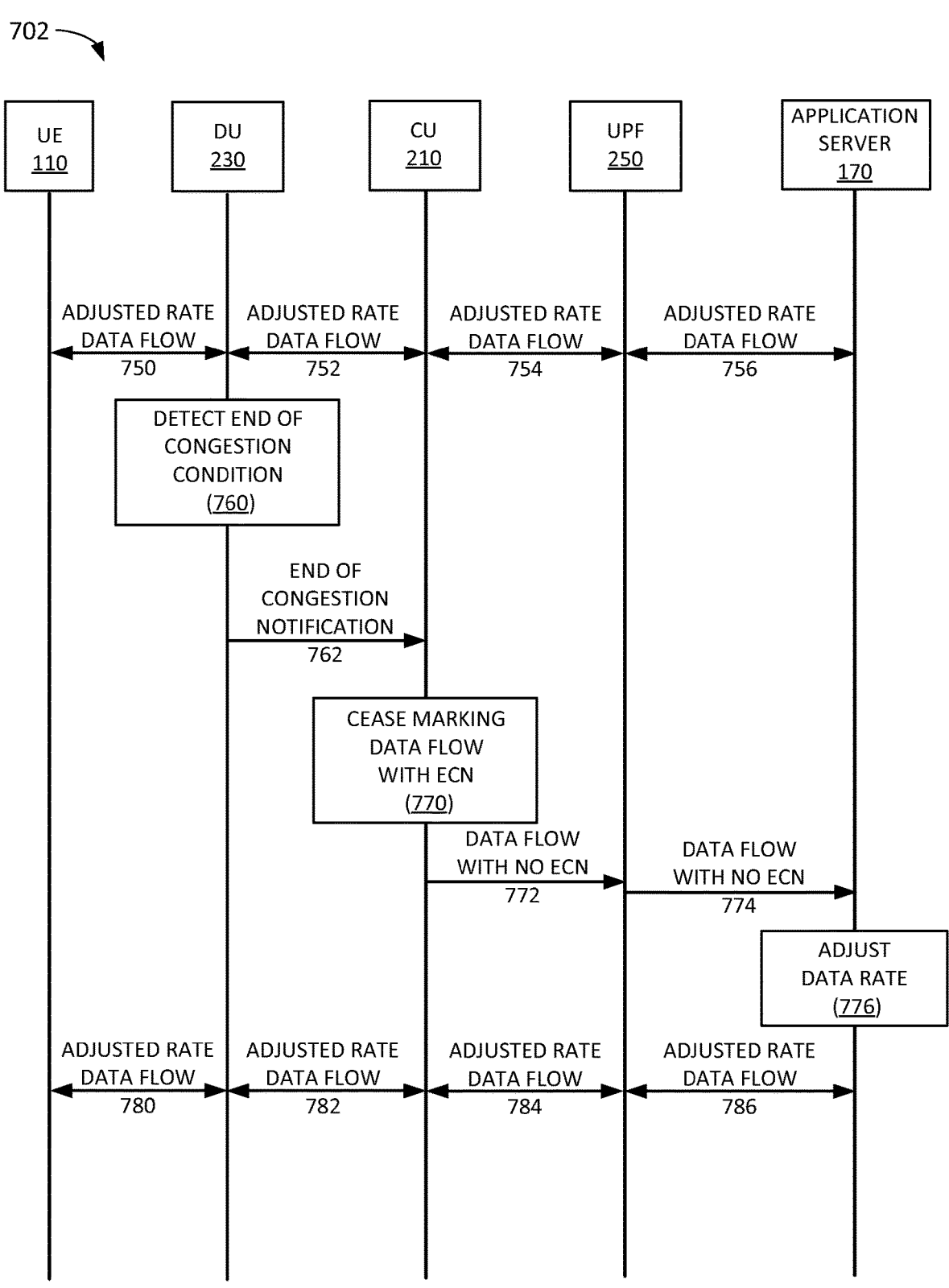

FIGS. 7A and 7B illustrate exemplary signal flows 701 and 702. As shown in FIG. 7A, signal flow 701 includes a data flow from UE device 110 to application server 170 via DU 230, CU 210, and UPF 250 (signals 710, 712, 714, and 716). For example, core network 150 may perform a PDU establishment procedure for UE device 110 when UE device 110 registers with core network 150. Core network 150 may select UPF 250 and establish a PDU session between UE device 110 and UPF 250 via RAN 130. As part of the PDU session establishment, a default data flow may be created in the PDU session (e.g., in the GTP tunnel established for the PDU session) using a PDU Session Modification procedure. Additionally, UE device 110 may request an additional data flow, such as when an application on UE device 110, and associated with application server 170, is activated. UE device 110 may send the data flow request to core network 150. Alternatively, a data flow may be created by core network 150 using application data associated with UE device 110 (e.g., based on an application ID associated with an application session request sent by UE device 110), and/or based on another type of request to establish a data flow in a PDU session. Core network 150 may then assign a TFT to the data flow and send the TFT to UE device 110. For example, the TFT may include a tuple, such as a 5-tuple that includes a source IP address, a source port, a destination IP address, a destination port, and a protocol, associated with the created data flow. UE device 110 may use the TFT to assign data packets to the data flow.

Additionally, core network 150 may send an instruction to RAN 130 to implement transport of the data flow from UE device 110 to core network 150 via RAN 130 and the transport network associated with RAN 130. CU-CP 212 may select a path in the transport network by, for example, selecting DU 230, midhaul 325, and/or CU-UP 214, as well as any intervening switches 220 in RAN 130. CU-CP 212 may then configure the selected CU-UP 314 and/or switches to implement the routing/forwarding of packets of the data flow using the TFT.

Once the data flow is created, DU 230 may monitor for a congestion condition and may detect a congestion condition (block 720). As an example, DU 230 may determine that a signal strength/quality for UE device 110 associated with the data flow has fallen below a signal strength/quality threshold for at least a threshold length of time, that loading for base station 120 associated with the data flow has risen above a loading threshold for at least a threshold length of time and may, in response, send a congestion notification to CU 210. In response, DU 230 may send a congestion notification to CU 210 (signal 730). In response, CU 210 may start marking the headers of IP packets associated with the data flow with an ECN (block 740) and marked packets of the data flow may reach application server 170 (signals 742 and 744).

Application server 170 may detect the ECN in the marked packets and may, in response, adjust the data rate of the data flow (block 746). For example, application server 170 may reduce the data rate for the data flow while the congestion condition is present. The data flow may continue with the adjusted data rate (signals 750, 752, 754, and 756).

Continuing to FIG. 7B, signal flow 702 includes the data flow with the adjusted data rate (signals 750, 752, 754, and 756). At a later time, DU 230 may detect an end to the congestion condition. As an example, DU 230 may determine that the signal strength/quality for UE device 110 associated with the data flow has no longer been below the signal strength/quality threshold for at least a threshold length of time, that loading for base station 120 associated with the data flow has no longer been above the loading threshold for at least a threshold length of time (block 760) and may, in response, send a notification to CU 210 indicating that the congestion condition has ended (signal 762). In response, CU 210 may cease marking the headers of IP packets associated with the data flow with an ECN (block 770) and packets of the data flow may reach application server 170 without the ECN marking (signals 772 and 774).

Application server 170 may detect that the packets are no longer marked with the ECN and may, in response, adjust the data rate of the data flow (block 776). For example, application server 170 may increase the data rate for the data flow to the data rate that was present before the congestion condition was detected. The data flow may continue with the newly adjusted data rate (signals 780, 782, 784, and 786).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signals have been described with respect to FIGS. 7A and 7B, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   monitoring, by a device, a data flow associated with a user equipment (UE) device in a Radio Access Network (RAN);
   detecting, by the device, a congestion condition for the monitored data flow associated with the UE device;
   generating, by the device, an Explicit Congestion Notification (ECN) in response to detecting the congestion condition; and
   marking, by the device, packets associated with the data flow with the generated ECN,
   wherein the marking includes marking packets travelling in an opposite direction to packets travelling a direction for which the congestion condition is detected.

2. The method of claim 1, wherein the device includes a Centralized Unit (CU) in the RAN, and wherein detecting the congestion condition for the monitored data flow associated with the UE device includes:
   receiving a congestion notification for the monitored data flow from a Distributed Unit (DU) in the RAN via an F1 interface.

3. The method of claim 2, wherein the congestion notification includes an indication that a signal strength or quality parameter value for wireless signals, for the monitored data flow associated with the UE device, is below a signal strength or quality threshold.

4. The method of claim 3, wherein the signal strength or quality parameter value includes a Channel Quality Indicator (CQI) value.

5. The method of claim 3, wherein the congestion notification further includes an indication that the signal strength or quality parameter value has been below the signal strength or quality threshold for at least a threshold length of time.

6. The method of claim 2, wherein the congestion notification includes an indication that a loading parameter value for a base station associated with the UE device is above a loading threshold.

7. The method of claim 6, wherein the loading parameter value includes a Physical Resource Block (PRB) utilization rate value.

8. The method of claim 2, further comprising:

receiving another notification, from the DU via the F1 interface, wherein the other notification indicates that the congestion condition has ceased to exist for at least a threshold length of time; and ceasing to mark packets associated with the data flow with the generated ECN.

9. The method of claim 1, wherein marking the packets associated with the data flow with the generated ECN includes:

marking packet headers with the generated ECN using Packet Data Convergence Protocol (PDCP).

10. The method of claim 1, wherein detecting the congestion condition for the monitored data flow associated with the UE device includes:

determining that a buffer level associated with the monitored data flow has exceeded a buffer threshold.

11. A device comprising:

a processor configured to:

monitor a data flow, associated with a user equipment (UE) device, in a Radio Access Network (RAN);

detect a congestion condition for the monitored data flow associated with the UE device;

generate an Explicit Congestion Notification (ECN) in response to detecting the congestion condition; and mark packets associated with the data flow with the generated ECN, wherein the processor configured to mark the packets is configured to mark packets travelling in an opposite direction to packets travelling a direction for which the congestion condition is detected.

12. The device of claim 11, wherein the device includes a Centralized Unit (CU) in the RAN, and wherein, when detecting the congestion condition for the monitored data flow associated with the UE device, the processor is further configured to:

receive a congestion notification for the monitored data flow from a Distributed Unit (DU) in the RAN via an F1 interface.

13. The device of claim 12, wherein the congestion notification includes an indication that a signal strength or quality parameter value for wireless signals, for the monitored data flow associated with the UE device, has been below a signal strength or quality threshold for at least a threshold length of time.

14. The device of claim 12, wherein the congestion notification includes an indication that a loading parameter value for a base station associated with the UE device is above a loading threshold.

15. The device of claim 12, wherein the processor is further configured to:

receive another notification, from the DU via the F1 interface, wherein the other notification indicates that the congestion condition has ceased to exist for at least a threshold length of time; and cease to mark packets associated with the data flow with the generated ECN.

16. The device of claim 11, wherein, when marking the packets associated with the data flow with the generated ECN, the processor is further configured to:

mark packet headers with the generated ECN using Packet Data Convergence Protocol (PDCP).

17. The device of claim 11, wherein, when detecting the congestion condition for the monitored data flow associated with the UE device, the processor is further configured to:

determine that a buffer level associated with the monitored data flow has exceeded a buffer threshold.

18. A system comprising:

a Centralized Unit (CU) in a Radio Access Network (RAN) configured to:

monitor a data flow, associated with a user equipment (UE) device, in the RAN;

detect a congestion condition for the monitored data flow associated with the UE device;

generate an Explicit Congestion Notification (ECN) in response to detecting the congestion condition; and mark packets associated with the data flow with the generated ECN, wherein the processor configured to mark the packets is configured to mark packets travelling in an opposite direction to packets travelling a direction for which the congestion condition is detected; and a Distributed Unit (DU) in the RAN configured to:

send a congestion notification for the monitored data flow to the CU via an F1 interface, wherein the CU is configured to detect the congestion condition for the monitored data flow associated with the UE device based on the congestion notification.

19. The system of claim 18, wherein the congestion notification includes an indication that a signal strength or quality parameter value for wireless signals, for the monitored data flow associated with the UE device, has been below a signal strength or quality threshold for at least a threshold length of time.

20. The system of claim 18, wherein the congestion notification includes an indication that a loading parameter value for a base station associated with the UE device is above a loading threshold.

\* \* \* \* \*